United States Patent
Kramer, Jr. et al.

(10) Patent No.: US 9,149,973 B2
(45) Date of Patent: Oct. 6, 2015

(54) APPARATUS FOR MAKING FLEXIBLE TUBING WITH ANNULAR CORRUGATIONS

(75) Inventors: Vance M. Kramer, Jr., Perrysburg, OH (US); Jonathan O. Rodebaugh, Perrysburg, OH (US)

(73) Assignee: CRUSHPROOF TUBING COMPANY, McComb, OH (US)

( * ) Notice: Subject to any disclaimer, the term of this patent is extended or adjusted under 35 U.S.C. 154(b) by 509 days.

(21) Appl. No.: 13/489,147

(22) Filed: Jun. 5, 2012

(65) Prior Publication Data
US 2013/0320599 A1 Dec. 5, 2013

(51) Int. Cl.
| | |
|---|---|
| B29C 49/28 | (2006.01) |
| B29C 49/02 | (2006.01) |
| B29C 53/00 | (2006.01) |
| B29C 49/48 | (2006.01) |
| B29C 49/58 | (2006.01) |
| B29L 16/00 | (2006.01) |
| B29L 23/18 | (2006.01) |
| B29K 21/00 | (2006.01) |
| B29C 49/00 | (2006.01) |
| B29K 105/24 | (2006.01) |

(52) U.S. Cl.
CPC ............... B29C 49/48 (2013.01); B29C 49/58 (2013.01); *B29C 49/0005* (2013.01); *B29C 2049/0089* (2013.01); *B29C 2049/4894* (2013.01); *B29K 2021/00* (2013.01); *B29K 2105/246* (2013.01); *B29L 2016/00* (2013.01); *B29L 2023/18* (2013.01)

(58) Field of Classification Search
CPC .. B29C 49/48; B29C 49/58; B29C 2049/0089
USPC ........ 425/387.1, 392, 393; 264/DIG. 52, 294, 264/320, 336, 347, 287, 507
See application file for complete search history.

(56) References Cited

U.S. PATENT DOCUMENTS

| | | | | |
|---|---|---|---|---|
| 3,028,290 | A * | 4/1962 | Roberts et al. | 264/506 |
| 3,583,189 | A * | 6/1971 | Kelstrom | 72/77 |
| 3,669,586 | A | 6/1972 | Kramer | |
| 3,705,780 | A | 12/1972 | Kramer et al. | |
| 3,809,522 | A | 5/1974 | Kramer | |
| 4,199,314 | A * | 4/1980 | Lupke et al. | 425/532 |
| 4,803,033 | A * | 2/1989 | Rowley | 264/339 |
| 5,141,697 | A * | 8/1992 | Wydra | 264/320 |
| 5,490,966 | A * | 2/1996 | Peterson et al. | 264/318 |
| 8,360,140 | B2 * | 1/2013 | Zabelka | 166/70 |
| 2004/0216298 | A1 * | 11/2004 | Gibson | 29/516 |
| 2006/0125149 | A1 * | 6/2006 | Takada et al. | 264/328.2 |
| 2007/0227606 | A1 * | 10/2007 | Sakazaki | 138/121 |
| 2012/0088405 | A1 * | 4/2012 | Wild et al. | 439/585 |
| 2013/0037159 | A1 * | 2/2013 | Kramer, Jr. et al. | 138/122 |
| 2014/0130930 | A1 * | 5/2014 | Ragner | 138/121 |

* cited by examiner

OTHER PUBLICATIONS

Co-pending U.S. Patent Aplication for "Coupling Device For Tube With Annular Corruguations", filed Jun. 5, 2012.

*Primary Examiner* — Nahida Sultana
(74) *Attorney, Agent, or Firm* — Rankin, Hill & Clark LLP

(57) ABSTRACT

An apparatus is disclosed that is used for making flexible tubing with annular corrugations from a sleeve of uncured rubber. The sleeve is positioned on a mandrel and radially expanded by fluid pressure into an external forming member that includes a plurality of annular discs loosely connected to a support and positioned in approximate axial alignment. A disc aligning tube is located around an axial length portion of the external forming member. While the sleeve is radially expanded, the aligning tube is slid in an axial direction to engage the discs and to urge any misaligned discs into accurate axial alignment.

4 Claims, 3 Drawing Sheets

APPARATUS FOR MAKING FLEXIBLE TUBING WITH ANNULAR CORRUGATIONS

FIELD OF THE INVENTION

This invention relates to the manufacture of crush resistant flexible tubing and especially to an improved apparatus for making such tubing from a sleeve of uncured elastomeric material that when formed and cured, provides a strong but flexible length of tubing with annular corrugations. More particularly, the invention relates to a novel device adapted for use in the process for making the tubing to produce improved uniformity in the annular corrugations.

BACKGROUND OF THE INVENTION

Flexible tubing with annular corrugations to provide crush resistance has been made in the past using the basic methods and apparatus shown and described in U.S. Pat. Nos. 3,669, 586; 3,705,780 and 3,809,522. These patents are referred to below and are incorporated by reference herein.

In general, the apparatus shown and described in the above patents includes a mandrel adapted to receive a sleeve of uncured rubber thereon and an external forming member adapted to be positioned around the mandrel and sleeve. The external forming member includes a plurality of axially spaced annular discs of uniform size and shape and which have circular openings coaxial with one another.

The discs are supported by various means, such as those shown and described in the above patents, to keep the discs in uniformly spaced relation and to permit the external forming member to be axially extended and axially collapsed to vary the spacing between the discs.

The apparatus also includes means for applying fluid pressure between the outer surface of the mandrel and the inner surface of the sleeve to radially expand portions of the sleeve into the annular spaces between the discs. The mandrel is preferably tubular and has a number of small openings in its tubular wall to for this purpose.

With the sleeve in its radially expanded condition, the external form may be axially collapsed with the annular wall portions of the sleeve still within the constricted annular spaces between the discs. This causes the radially expanded wall portions of the sleeve to be squeezed in accordion fashion between the discs to form preliminary annular impressions in the uncured rubber sleeve.

More specifically, the apparatus to which the present invention relates is a variation of the general type of apparatus described above. In this variation, the apparatus has an external forming member that uses a flexible tubular support for positioning the discs in equally spaced relation and in approximate axial alignment. The tubular support is preferably formed of cured elastomeric material and has a generally uniform wall thickness. The support also has annular corrugations with alternating internal and external ridges and grooves. The internal ridges have a diameter slightly greater than the outer diameter of the sleeve. The discs are positioned in the external annular grooves of the tubular support.

Thus, when the sleeve is radially expanded, the outer surface of the sleeve is forced into engagement with the inner surface of the tubular support to form annular bulges between the internal ridges. Then, when the external forming member is axially collapsed, the radially expanded annular bulges of the sleeve are squeezed in accordion fashion within the internal grooves of the tubular support to form preliminary annular impressions.

Then the external forming member is axially extended together with the sleeve to permit the sleeve to be removed from the mandrel and external forming member. After this, the sleeve is placed on a curing mandrel where it is axially foreshortened into annularly corrugated form with the desired spacing between adjacent annular corrugations. Finally, the sleeve and the curing mandrel are placed in an oven to cure the sleeve and set the corrugations.

The tubular product resulting from the use of the apparatus described above is both flexible and resilient, but also has sufficient crush resistance to satisfy most applications. In addition, the tubular product has a wall that defines both internal and external annular ridges and grooves along at least a portion of the tube length. In other words, the wall portions that define the annular external ridges, also define on their opposite side the annular internal grooves. Typical applications for the resulting product include farm machinery, particularly seeding equipment.

One problem with the type of external forming member that uses a flexible tubular support for positioning the discs is that the discs are not tightly retained in the external grooves of the support but rather are somewhat loosely carried. As a result, when the underlying uncured rubber sleeve is radially expanded by fluid pressure, the discs may not be accurately positioned in axial alignment with one another. This results in irregularities in the annular bulges of the sleeve and thus, corresponding irregularities in the preliminary annular impressions produced when the external forming member is axially collapsed.

The end result is that in some instances, there are visible irregularities in the annular corrugations of the resulting tubular product. While these visible irregularities do not affect the performance of the tubing, it would be desirable from an aesthetic point of view to produce a product with more uniform annular corrugations.

The device of the present invention, when used in association with the external forming member described above, reduces the visible irregularities referred to and affords other features and advantages heretofore not obtainable.

SUMMARY OF THE INVENTION

The improved appearance of the annularly corrugated tubing produced using the type of external forming member with a flexible tubular support to position the discs, is obtained by the unique device of the invention. The device consists of at least one rigid disc aligning tube for positioning the discs accurately in coaxial relation. The aligning tube is positioned around an axial length portion of the external forming member and has an inner diameter slightly greater than the outer diameter of the discs.

When the uncured rubber sleeve is radially expanded by fluid pressure, the aligning tube may be slid axially along the external forming member to engage the discs and urge them into accurate coaxial relationship with one another to assure uniformity in the preliminary annular impressions formed in the uncured rubber sleeve. This ultimately results in the production of annularly corrugated rubber tubing with fewer if any visible irregularities in the corrugations.

The axial length of the aligning tube should be relatively short to minimize friction during the sliding movement but long enough to engage enough discs to assure accurate axial alignment of the aligning tube. Typically, the axial length should be sufficient to engage seven or eight discs at a time.

In the preferred form of the device, two disc aligning tubes are utilized, one being initially positioned at each end of the external forming member.

In order to assure that any discs that are initially out of axial alignment are moved into alignment by the respective aligning tube, the inner edges of the ends of the aligning tube may be beveled. This enables the initial engagement between a misaligned disc and the respective aligning tube to be at a sloping surface to urge the disc in a radial direction into proper alignment.

DESCRIPTION OF THE PREFERRED EMBODIMENT

Figure 1:
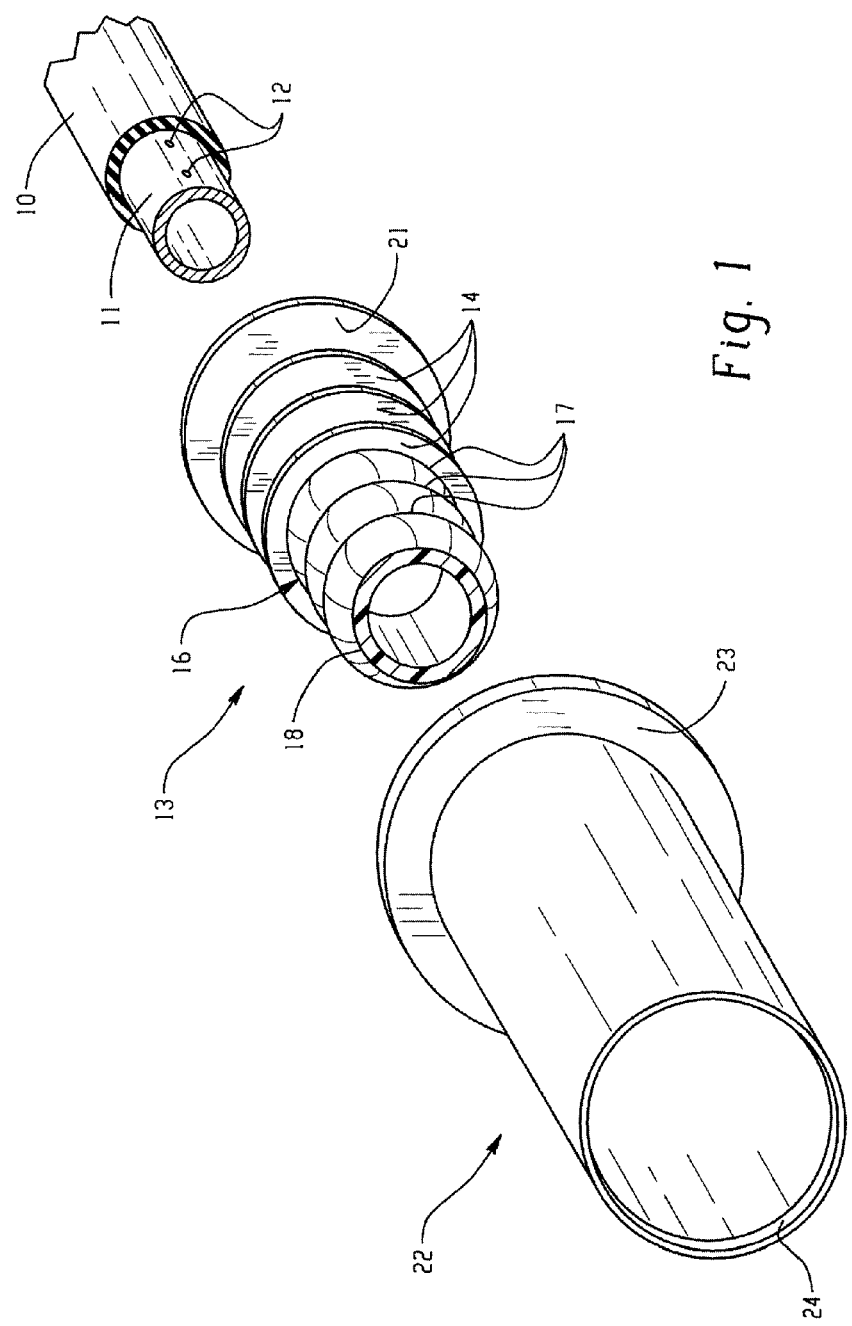
FIG. 1 is an exploded perspective view with parts broken away, showing an apparatus used in portions of the process for forming preliminary impressions in an uncured rubber sleeve, the apparatus including a novel disc aligning tube embodying the invention.

Referring more particularly to the drawings and initially to FIG. 1, there is shown an improved apparatus embodying the invention and adapted for making annularly corrugated tubing from an extruded sleeve 10 of uncured rubber. The sleeve may be formed, for example of EDPM rubber, nitrile rubber or other elastomeric composition depending on the particular application. The sleeve 10 is slid over a tubular cylindrical mandrel 11 which is provided with a number of holes 12 extending through the tubular wall. One end of the mandrel 11 is connected to an air pressure source for supplying air under pressure to the inside of the mandrel and then outwardly through the holes 12 to apply pressure between the exterior surface of the mandrel and the interior surface of the sleeve 10.

Figure 2:
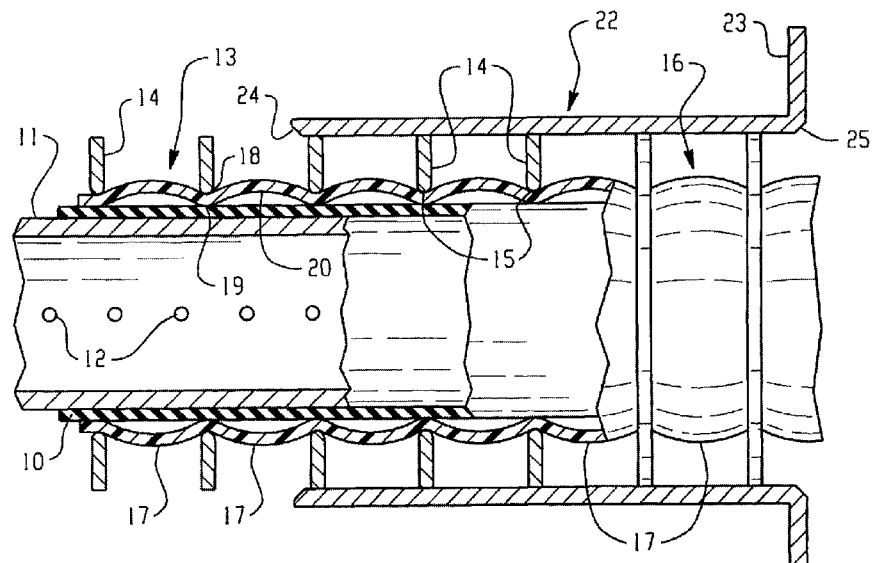
FIG. 2 is a fragmentary side elevation on an enlarged scale with parts broken away, showing the apparatus of the invention in assembled condition preparatory to initiating the forming process utilizing the disc aligning tube of the invention.

Once the sleeve 10 has been slid into position, an external forming member 13 is slid over the sleeve as shown in FIG. 2. The external forming member consists of a plurality of annular discs 14 of uniform size and shape and preferably formed of steel. The circular openings 15 in the annular discs are arranged to be generally coaxial with one another.

The external forming member 13 also has a flexible tubular support 16 for positioning the discs 14 in equally spaced relation and in approximate axial alignment. The tubular support 16 is preferably formed of cured elastomeric material and has a generally uniform wall thickness.

Figure 3:
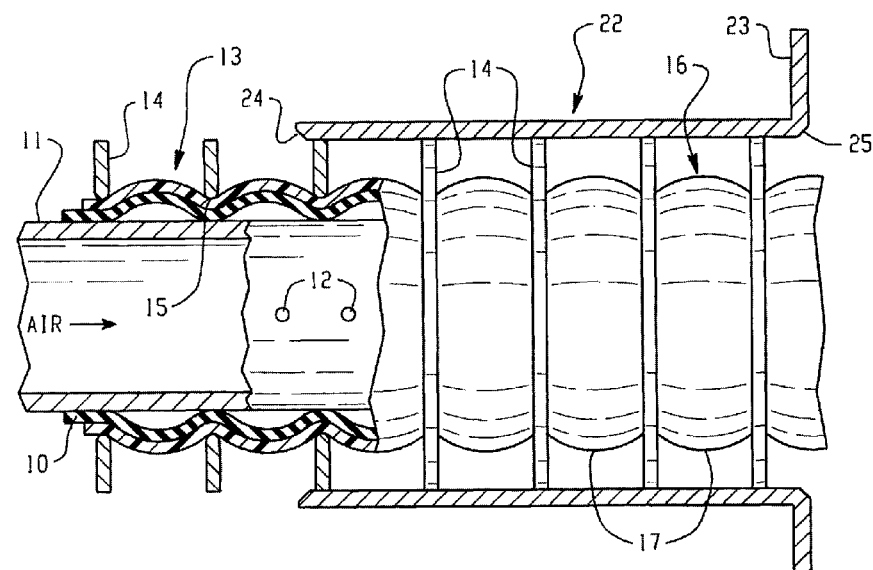
FIG. 3 is a fragmentary side elevation on an enlarged scale with parts broken away, showing an uncured rubber sleeve radially expanded by fluid pressure during the forming process.

More particularly, the tubular support 16 has annular corrugations with alternating external ridges 17 and grooves 18 and corresponding alternating internal ridges 19 and grooves 20. The external ridges 19 have a diameter slightly greater than the outer diameter of the sleeve 10. The discs 14 are positioned in the external annular grooves 18 as best shown in FIGS. 2 and 3, the diameter of the external grooves 18 being approximately the same as the internal diameter of the openings 15 in the discs 14. The external forming member 13 is also provided with an annular flange 21 at one end as shown in FIG. 1, the flange being of greater diameter than the diameter of the discs 14 and being tightly secured to the respective end of the tubular support 16.

The tubular support 16 is sufficiently flexible and resilient to permit the external forming member 13 to be axially extended and axially collapsed to vary the spacing between the discs 14. The forming member 13 is shown in its axially extended condition in FIGS. 2, 3 and 4 and in its axially collapsed condition in FIG. 5.

In accordance with the invention, the apparatus includes a unique disc aligning tube 22 for positioning the discs 14 accurately in axial alignment. The aligning tube is positioned around an axial length portion of the external forming member 13 as shown in FIGS. 2 and 3, and has an inner diameter slightly greater than the outer diameter of the discs.

Figure 4:
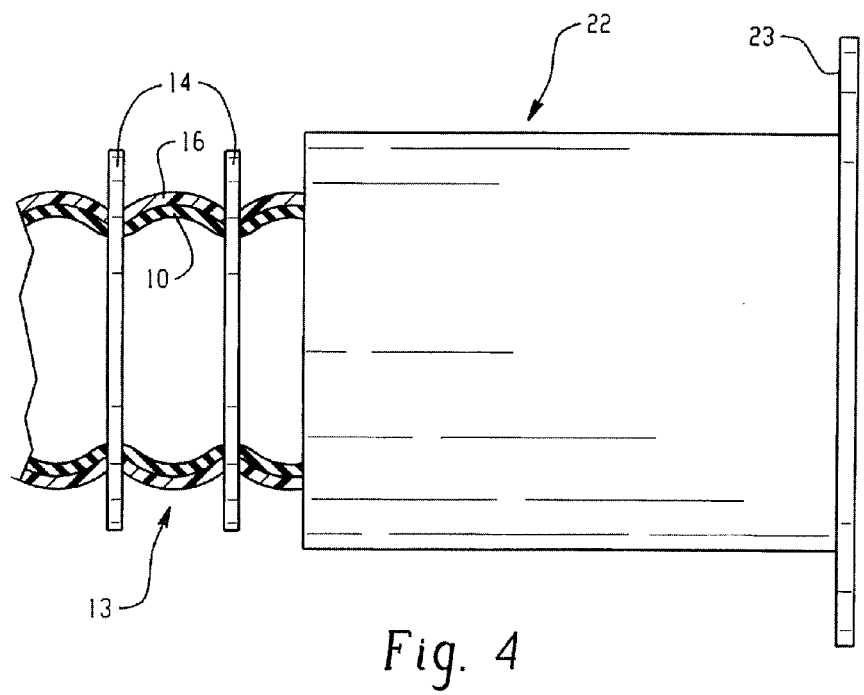
FIG. 4 is a fragmentary side elevation on an enlarged scale with parts broken away, showing a portion of the forming process wherein the aligning tube is slid axially along the external forming member to engage the discs of the forming member and urge them into accurate axial alignment.
Figure 5:
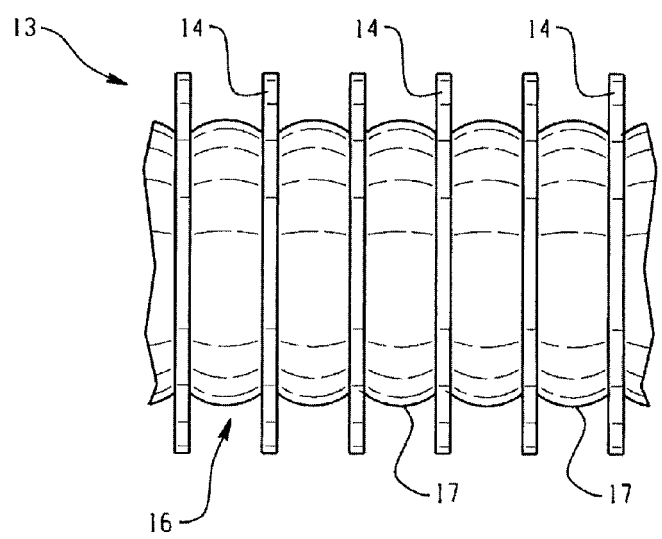
FIG. 5 is a fragmentary side elevation on an enlarged scale, showing the external forming member (with its discs in accurate axial alignment) axially collapsed to squeeze the radially expanded portions of the uncured rubber sleeve between the wall portions of the inner grooves of the tubular support to form preliminary annular impressions.

Once the uncured rubber sleeve 10 has been radially expanded by air pressure into the internal grooves 20 of the tubular support 16 (as shown in FIGS. 3 and 4) the external grooves 18 of the tubular support grip the discs 14 more tightly but not necessarily in accurate alignment. At this point, the disc aligning tube 22 is slid axially along the external forming member 13 as shown in FIG. 4, to engage any misaligned discs and urge them into correct axial alignment.

The axial length of the aligning tube 22 in the embodiment shown is sufficient to engage seven or eight discs at a time; however the length may be varied to satisfy the conditions of the particular application. Also, one end of the aligning tube has a circular flange 23 to assist an operator in sliding the tube. As shown in FIGS. 1, 2 and 3, the inner edges of the ends of the aligning tube are beveled (see 24 and 25). This assures that the initial contact between a misaligned disc and the aligning tube is at a sloping surface to urge the disc in a radial direction into proper alignment.

By using the disc aligning tube described above to achieve more accurate alignment of the discs 14, improved uniformity in the preliminary annular impressions in the uncured rubber sleeve is obtained. This ultimately results in the production of annularly corrugated rubber tubing with fewer if any visible irregularities in the corrugations.

While the invention has been shown and described with respect to a specific embodiment thereof, this intended for the purpose of illustration rather than limitation and other variations and modifications of the specific embodiment herein shown and described will be apparent to those skilled in the art, all within the spirit and scope of the invention. Accordingly, the patent is not to be limited in scope and effect to the specific embodiment herein shown and described, or in any other way that is inconsistent with the extent to which the progress in the art has been advanced by the invention.

What is claimed:

1. A method for making flexible tubing with annular corrugations from a sleeve of uncured rubber, the method comprising:
    placing a sleeve of uncured rubber on a mandrel;
    placing an external forming member around said mandrel and sleeve, said external forming member including a plurality of annular discs and a flexible tubular support for loosely positioning said discs in axially spaced relation and in approximate axial alignment, said flexible tubular support having annular corrugations with alternating internal and external ridges and grooves and said discs being loosely supported in said external grooves;

radially expanding said sleeve with fluid pressure to force annular portions of said sleeve into said internal grooves;

sliding an aligning tube axially along said external forming member to engage said discs and urge them into accurate axial alignment with one another to assure uniformity when preliminary annular impressions are formed in said uncured rubber sleeve, wherein an interior end edge of said disc aligning tube is beveled to assure that initial engagement between a misaligned disc and the disc aligning tube urges the engaged disc in a radial direction into accurate axial alignment;

axially collapsing said external forming member to squeeze said annular portions of said sleeve in said internal grooves to form the preliminary annular impressions in said sleeve;

removing said sleeve from said mandrel and said external forming member;

placing said sleeve on a curing mandrel in an axially foreshortened condition with said preliminary annular impressions spaced apart a predetermined axial distance; and heating said sleeve while on said mandrel to cure said sleeve and produce a length of annularly corrugated rubber tubing.

2. The method as defined in claim 1, wherein an axial length of said disc aligning tube is sufficient to surround from seven to eight discs at a time.

3. A method for making flexible tubing with annular corrugations from a sleeve of uncured rubber, the method comprising:

placing a sleeve of uncured rubber on a mandrel;

placing an external forming member around said mandrel and sleeve, said external forming member including a plurality of annular discs and a flexible tubular support for loosely positioning said discs in axially spaced relation and in approximate axial alignment, said flexible tubular support having annular corrugations with alternating internal and external ridges and grooves and said discs being loosely supported in said external grooves;

radially expanding said sleeve with fluid pressure to force annular portions of said sleeve into said internal grooves;

sliding a first disc aligning tube positioned around said external forming member axially along a first end of said external forming member and a second disc aligning tube positioned around said external forming member axially along a second end of said external forming member to engage said discs and urge them into accurate axial alignment with one another to assure uniformity when preliminary annular impressions are formed in said uncured rubber sleeve;

axially collapsing said external forming member to squeeze said annular portions of said sleeve in said internal grooves to form the preliminary annular impressions in said sleeve;

removing said sleeve from said mandrel and said external forming member;

placing said sleeve on a curing mandrel in an axially foreshortened condition with said preliminary annular impressions spaced apart a predetermined axial distance; and heating said sleeve while on said mandrel to cure said sleeve and produce a length of annularly corrugated rubber tubing.

4. The method as defined in claim 3, wherein an axial length of said disc aligning tube is sufficient to surround from seven to eight discs at a time.

* * * * *